US011853381B2

(12) United States Patent
Li et al.

(10) Patent No.: US 11,853,381 B2
(45) Date of Patent: Dec. 26, 2023

(54) HYBRID FETCHING USING A ON-DEVICE CACHE

(71) Applicant: Google LLC, Mountain View, CA (US)

(72) Inventors: Xin Li, Mountain View, CA (US);
Yixin Wang, Mountain View, CA (US);
Benedict Liang, Mountain View, CA (US);
Dharminder Singh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/098,016

(22) Filed: Nov. 13, 2020

(65) Prior Publication Data

US 2022/0156340 A1 May 19, 2022

(51) Int. Cl.
*G06F 16/00* (2019.01)
*G06F 16/957* (2019.01)
(Continued)

(52) U.S. Cl.
CPC ...... *G06F 16/9574* (2019.01); *G06F 16/9035* (2019.01); *G06F 16/90324* (2019.01); *G06F 16/90332* (2019.01); *G06F 16/90335* (2019.01)

(58) Field of Classification Search
CPC ............. G06F 16/9035; G06F 16/9574; G06F 16/90324; G06F 16/90332; G06F 16/90335
(Continued)

(56) References Cited

U.S. PATENT DOCUMENTS 6,067,565 A * 5/2000 Horvitz ................... H04L 67/62
707/E17.107
6,085,226 A * 7/2000 Horvitz ............... G06F 16/9574
707/E17.12
(Continued)

FOREIGN PATENT DOCUMENTS

JP 2006285982 A 10/2006

OTHER PUBLICATIONS

"ŠKODA presents new Digital Assistant: "Okay, Laura!"" Sep. 25, 2019. Retrieved from the Internet: <https://www.skoda-storyboard.com/en/press-releases/skoda-presents-new-digital-assistant-okay-laura/> 2 pp.
(Continued)

*Primary Examiner* — Amy Ng
*Assistant Examiner* — Rezwanul Mahmood
(74) *Attorney, Agent, or Firm* — Shumaker & Sieffert, P.A.

(57) ABSTRACT

Techniques of this disclosure are directed to enable a computing device to process voice queries and provide query answers even when the computing device and vehicle do not have internet connectivity. According to the disclosed techniques, a computing device may detect a query via input devices of the computing device and output a query answer determined based on the detected query. Rather than directly querying a remote computing system, various aspects of the techniques of this disclosure may enable the computing device to use a query answer cache to generate the query answer. The query answer cache may include predicted queries and query answers retrieved from a query answer cache of a remote computing system, thereby enabling the computing device to respond to the detected queries while experiencing unreliable internet connection.

18 Claims, 6 Drawing Sheets

(51) Int. Cl.
*G06F 16/903* (2019.01)
*G06F 16/9032* (2019.01)
*G06F 16/9035* (2019.01)

(58) Field of Classification Search
USPC .......................................................... 707/722
See application file for complete search history.

(56) References Cited

U.S. PATENT DOCUMENTS

| | | | | |
|---|---|---|---|---|
| 6,182,133 | B1* | 1/2001 | Horvitz | G06F 16/9574 709/203 |
| 7,680,797 | B1* | 3/2010 | Singh | G06F 16/24552 709/229 |
| 8,145,622 | B2* | 3/2012 | Yin | G06F 16/951 707/713 |
| 8,156,109 | B2* | 4/2012 | Kamvar | G06F 16/3325 707/713 |
| 8,312,032 | B2* | 11/2012 | Choi | G06F 16/3322 707/765 |
| 8,515,954 | B2* | 8/2013 | Gibbs | G06F 16/3322 707/758 |
| 8,577,913 | B1* | 11/2013 | Hansson | G06F 16/9535 707/767 |
| 8,996,550 | B2* | 3/2015 | Ko | G06F 40/274 715/264 |
| 9,436,781 | B2* | 9/2016 | Gibbs | G06F 40/53 |
| 9,720,955 | B1* | 8/2017 | Cao | H04L 51/046 |
| 10,140,017 | B2* | 11/2018 | Luipold | G06F 16/248 |
| 10,437,820 | B2* | 10/2019 | Elias | G06F 16/24539 |
| 10,467,238 | B2* | 11/2019 | Loomans | G06F 16/248 |
| 10,467,327 | B1* | 11/2019 | Arazi | G06Q 30/02 |
| 10,607,500 | B1* | 3/2020 | Rakshit | G06F 3/165 |
| 10,664,157 | B2* | 5/2020 | Kong | G06F 16/951 |
| 10,705,794 | B2* | 7/2020 | Gruber | G10L 15/22 |
| 10,706,237 | B2* | 7/2020 | Sarikaya | G06F 40/253 |
| 10,885,039 | B2* | 1/2021 | Hornkvist | G06F 16/9537 |
| 10,909,124 | B2* | 2/2021 | Lim | G06F 16/9535 |
| 10,991,364 | B1* | 4/2021 | Hoover | G10L 15/30 |
| 11,070,949 | B2* | 7/2021 | Gross | H04W 4/50 |
| 11,335,346 | B1* | 5/2022 | Su | G06F 40/295 |
| 11,520,677 | B1* | 12/2022 | Arazi | G06F 11/079 |
| 11,544,591 | B2* | 1/2023 | Paulina | G16H 20/70 |
| 11,625,450 | B1* | 4/2023 | Roman | H04L 67/535 707/721 |
| 11,645,277 | B2* | 5/2023 | Ross | G06N 20/00 707/768 |
| 11,741,947 | B2* | 8/2023 | Tripathi | G10L 15/16 704/232 |
| 2004/0044516 | A1* | 3/2004 | Kennewick | G10L 15/1822 704/E15.04 |
| 2004/0249798 | A1* | 12/2004 | Demarcken | G06F 16/24552 |
| 2006/0224579 | A1* | 10/2006 | Zheng | G06F 16/953 707/999.005 |
| 2009/0037382 | A1* | 2/2009 | Ansari | G06F 16/68 |
| 2009/0106321 | A1* | 4/2009 | Das | G06F 16/24542 |
| 2009/0307176 | A1* | 12/2009 | Jeong | G06F 16/337 706/52 |
| 2010/0010977 | A1* | 1/2010 | Choi | G06F 16/951 707/E17.014 |
| 2010/0332513 | A1* | 12/2010 | Azar | G06F 16/24545 707/753 |
| 2011/0055202 | A1* | 3/2011 | Heimendinger | G06F 16/245 706/14 |
| 2011/0196852 | A1* | 8/2011 | Srikanth | G06F 16/951 707/765 |
| 2012/0078727 | A1* | 3/2012 | Lee | G06Q 30/02 705/14.4 |
| 2012/0084151 | A1* | 4/2012 | Kozak | G06Q 30/02 705/14.58 |
| 2012/0084291 | A1* | 4/2012 | Chung | G06F 16/14 707/E17.084 |
| 2012/0084348 | A1* | 4/2012 | Lee | G06Q 30/0261 709/203 |
| 2012/0084349 | A1* | 4/2012 | Lee | H04L 67/025 709/203 |
| 2012/0158685 | A1* | 6/2012 | White | G06F 16/9535 707/723 |
| 2013/0198269 | A1* | 8/2013 | Fleischman | H04L 69/40 709/203 |
| 2013/0204978 | A1* | 8/2013 | Fleischman | H04L 61/4511 709/219 |
| 2014/0047365 | A1* | 2/2014 | Clark | G06F 3/0484 715/765 |
| 2014/0280016 | A1* | 9/2014 | Williams | G06F 16/3322 707/710 |
| 2015/0066594 | A1* | 3/2015 | Li | G06Q 30/0202 705/7.31 |
| 2015/0181417 | A1* | 6/2015 | Snider | H04L 67/01 370/338 |
| 2015/0281168 | A1* | 10/2015 | Holloway | H04L 61/4511 709/245 |
| 2016/0070790 | A1* | 3/2016 | Bhat | G06F 16/90324 707/722 |
| 2016/0092447 | A1* | 3/2016 | Venkataraman | G06F 16/735 707/765 |
| 2016/0105308 | A1* | 4/2016 | Dutt | G06F 9/4843 706/19 |
| 2016/0179953 | A1* | 6/2016 | Klotz, Jr. | G06F 16/242 707/722 |
| 2016/0188731 | A1* | 6/2016 | Dai | H04L 67/55 707/732 |
| 2016/0188742 | A1* | 6/2016 | Ingvoldstad | G06F 16/9562 707/722 |
| 2016/0360336 | A1* | 12/2016 | Gross | H04W 4/025 |
| 2016/0360382 | A1* | 12/2016 | Gross | G06F 3/04883 |
| 2016/0364382 | A1* | 12/2016 | Sarikaya | G06F 40/40 |
| 2017/0046347 | A1 | 2/2017 | Zhou et al. | |
| 2017/0083821 | A1* | 3/2017 | Foerster | G06N 5/022 |
| 2017/0097936 | A1* | 4/2017 | Glover | G06F 16/2425 |
| 2017/0177710 | A1* | 6/2017 | Burlik | G06F 40/205 |
| 2017/0188168 | A1* | 6/2017 | Lyren | H04S 7/305 |
| 2017/0199916 | A1* | 7/2017 | Loomans | G06F 16/951 |
| 2017/0270159 | A1* | 9/2017 | Wang | G06F 16/2425 |
| 2017/0277655 | A1* | 9/2017 | Das | G06F 3/061 |
| 2018/0024994 | A1* | 1/2018 | Sarikaya | G06F 40/253 704/9 |
| 2018/0054499 | A1* | 2/2018 | Greenberg | H04L 67/02 |
| 2018/0075130 | A1* | 3/2018 | Rodgers | G06F 16/285 |
| 2018/0115627 | A1 | 4/2018 | Song et al. | |
| 2018/0285458 | A1 | 10/2018 | Khalkechev et al. | |
| 2018/0336200 | A1* | 11/2018 | Lim | G06F 16/24578 |
| 2019/0042071 | A1* | 2/2019 | Gandhi | H04W 4/185 |
| 2019/0042988 | A1* | 2/2019 | Brown | G06N 5/022 |
| 2019/0163902 | A1* | 5/2019 | Reid | G06F 12/1009 |
| 2019/0171728 | A1* | 6/2019 | Wakankar | G06F 16/90324 |
| 2019/0370305 | A1* | 12/2019 | Liu | G06F 16/3329 |
| 2019/0384762 | A1* | 12/2019 | Hill | G06F 16/2272 |
| 2019/0387076 | A1 | 12/2019 | Sung et al. | |
| 2020/0065319 | A1* | 2/2020 | Zu | H04L 67/55 |
| 2020/0117742 | A1* | 4/2020 | Huang | G06F 16/24564 |
| 2020/0145310 | A1* | 5/2020 | Lodhia | H04L 67/568 |
| 2020/0151273 | A1* | 5/2020 | Ray | G06F 16/248 |
| 2020/0159795 | A1* | 5/2020 | Weldemariam | G06F 16/9535 |
| 2020/0303938 | A1* | 9/2020 | Owen | H01M 10/44 |
| 2020/0394228 | A1* | 12/2020 | Salminen | G06F 16/909 |
| 2021/0209118 | A1* | 7/2021 | Reuther | G06F 16/242 |
| 2021/0326344 | A1* | 10/2021 | Schaller | G06F 16/24575 |
| 2021/0406735 | A1* | 12/2021 | Nahamoo | G06F 40/247 |
| 2022/0108689 | A1* | 4/2022 | Tripathi | G10L 15/26 |
| 2022/0122622 | A1* | 4/2022 | Narayanan | G06N 3/08 |
| 2022/0156340 | A1* | 5/2022 | Li | G06F 16/24522 |
| 2022/0157314 | A1* | 5/2022 | Varshney | G06F 16/90332 |
| 2022/0272048 | A1* | 8/2022 | Liang | H04L 47/726 |
| 2022/0310062 | A1* | 9/2022 | Sainath | G10L 15/32 |
| 2022/0335043 | A1* | 10/2022 | Zheng | G06N 20/10 |
| 2022/0405313 | A1* | 12/2022 | Banipal | G06N 3/047 |
| 2023/0016824 | A1* | 1/2023 | Benedetto | A63F 13/86 |
| 2023/0096805 | A1* | 3/2023 | Kim | G06N 3/0895 704/232 |
| 2023/0197070 | A1* | 6/2023 | Byrne | G10L 13/02 704/235 |

(56) References Cited

U.S. PATENT DOCUMENTS

OTHER PUBLICATIONS

Strimel, et al. "Statistical Model Compression for Small-Footprint Natural Language Understanding", Alexa Machine Learning. Jul. 19, 2019. 5 pp.

"German Autolabs presents Chris—the first digital assistant for drivers", German Autolabs, Aug. 28, 2018. Retrieved from the Internet: <https://www.germanautolabs.com/press/german-autolabs-presents-chris-the-first-digital-assistant- for-drivers> 3 pp.

Fischer, "Car, we have to talk! Bosch puts the voice assistant behind the wheel", BOSCH Press Release, Jan. 3, 2018. 3 pp.

Locklear, "Panasonic and Alexa Onboard bring offline voice control to your car", engadget, Jan. 8, 2018. Retrieved from the Internet: <https://www.engadget.com/2018-01-08-panasonic-alexa-onboard-offline-voice-control-vehicle.html#:~: text=At%20CES%20today%2C%20Panasonic%20announced,your%20home%20to%20your%20vehicle.> 2 pp.

Extended Search Report from counterpart European Application No. 21197839.0 dated Mar. 14, 2022, 9 pp.

Parvathy P.R. et al., "2TierCoCS: A Two-tier Cooperative Caching Scheme for Internet-based Vehicular ad HocNetworks," Procedia Computer Science, vol. 46, 2015, pp. 1079-1086.

First Examination Report from counterpart Indian Application No. 202144041618 dated Jun. 6, 2022, 06 pp.

Response to Extended Search Report dated Mar. 14, 2022, from counterpart European Application No. 21197839.0 filed Oct. 12, 2022, 38 pp.

Office Action from counterpart Japanese Application No. 2021-161158 dated Feb. 21, 2023, 6 pp.

Response to First Examination Report dated Jun. 6, 2022, from counterpart Indian Application No. 202144041618 filed Nov. 18, 2022, 23 pp.

Response to Office Action, and translation thereof, dated Feb. 21, 2023, from counterpart Japanese Application No. 2021-161158 filed Jul. 12, 2023, 10 pp.

Response to Communication pursuant to Article 94(3) EPC dated Apr. 17, 2023, from counterpart European Application No. 21197839.0 filed Aug. 1, 2023, 22 pp.

Communication pursuant to Article 94(3) EPC from counterpart European Application No. 21197839.0 dated Apr. 17, 2023, 9 pp.

Gupta et al., "Query Distribution Estimation and Predictive Caching in Mobile Ad Hoc Networks", Proceedings of the Seventh ACM International Workshop on Data Engineering for Wireless and Mobile Access, Jun. 13, 2008, pp. 24-30.

Office Action, and translation thereof, from counterpart Korean Application No. 10-2021-0135909 dated Apr. 18, 2023, 20 pp.

Decision of Rejection, and translation thereof, from counterpart Korean Application No. 10-2021-0135909 dated Oct. 10, 2023, 14 pp.

Office Action from counterpart Japanese Application No. 2021-161158 dated Aug. 16, 2023, 4 pp.

* cited by examiner

HYBRID FETCHING USING A ON-DEVICE CACHE

BACKGROUND

Vehicles, such as automobiles, motorcycles, aircraft, and watercraft, may include one or more computing systems for performing functions and providing occupants with information, entertainment, assistance, and/or environmental control. For instance, an automobile may include an entertainment system for providing entertainment content, a navigation system for providing information and navigational assistance, a temperature control system for heating or cooling the in-vehicle cabin, a control system for adjusting various components or features of the automobile (e.g., a sunroof or window shades), or an "infotainment system" that performs some or all of these aforesaid functions. Modern vehicles are often equipped with an automotive head unit (AHU) having a display device (e.g., presence-sensitive display) and a compute engine, which is configured to execute an operating system and one or more applications.

In many cases, vehicle operators may search one or more queries while traveling in vehicles, and the AHU may provide query answers via a display or a microphone. However, answers of the queries may not be available at all times during travel, especially when a vehicle is out of range of an internet connection.

SUMMARY

In general, techniques of this disclosure are directed to enable a computing device to process queries (e.g., voice queries or text queries) and provide query answers without requiring an active network connection. According to the disclosed techniques, a computing device may detect a query via input devices of the computing device and output a query answer determined based on the detected query without requiring the computing device to, after receiving the query, send a request to a remote computing system and wait for a response from the remote computing system. Rather than directly querying a remote computing system, various aspects of the techniques of this disclosure may enable the computing device to use a local query answer cache (i.e., a query answer cache stored locally at the computing device) to generate the query answer. The query answer cache may include predicted queries and query answers retrieved from a query answer cache of a remote computing system, thereby enabling the computing device to respond to the detected queries while experiencing unreliable internet connection. The query answer cache may include predicted queries and query answers that a user is predicted to ask, thereby enhancing traditional offline query support. Alternatively, or in addition, using such a query answer cache may reduce the amount of time required for the computing device to provide the query answers even when the computing device has a reliable internet connection. In this way, the disclosed techniques may reduce query answer latency and reduce or eliminate network data used at the time the user provides the query, thereby potentially improving the search efficiency of the computing device.

In one example, the disclosure is directed to a method that includes receiving, by a computing device, a user input; determining, by the computing device and based at least in part on the user input, at least one text query; responsive to determining the at least one text query, generating, by the computing device, one or more context parameters associated with the at least one text query, wherein the one or more context parameters include at least one of a current time, a current location, a current user of the computing device, a set of historical user queries, a set of historical user behaviors, and a predicted destination; querying, by the computing device and based on the at least one text query and the one or more context parameters, a query answer cache of the computing device to generate a query result; determining, based on the query result, whether the query answer cache includes a query answer for the at least one text query and the one or more context parameters; responsive to determining that the query answer cache does not include the query answer: sending, from the computing device to a remote computing system, an indication of the at least one text query and an indication of the one or more context parameters; and receiving, from the remote computing system, an indication of the query answer, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters; and outputting, by the computing device, an indication of the query answer.

In another example, various aspects of the techniques are directed to a computing device that includes at least one processor; and at least one computer-readable storage device storing instructions that, when executed by the at least one processor, cause the at least one processor to: receive a user input; determine at least one text query based at least in part on the user input; responsive to determining the at least one text query, generate one or more context parameters associated with the at least one text query, wherein the one or more context parameters include at least one of a current time, a current location, a current user of the computing device, a set of historical user queries, a set of historical user behaviors, and a predicted destination; query a query answer cache of the computing device to generate a query result based on the at least one text query and the one or more context parameters; determine whether the query answer cache includes a query answer for the at least one text query and the one or more context parameters based on the query result; responsive to determining that the query answer cache does not include the query answer: send an indication of the at least one text query and an indication of the one or more context parameters to a remote computing system; and receive an indication of the query answer from the remote computing system, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters; and output an indication of the query answer.

In another example, various aspects of the techniques are directed to a computer-readable storage device storing instructions that, when executed, cause at least one processor of a computing device to perform operations. These example operations include receiving a user input; determining, based at least in part on the user input, at least one text query; responsive to determining the at least one text query, generating, one or more context parameters associated with the at least one text query, wherein the one or more context parameters include at least one of a current time, a current location, a current user of the computing device, a set of historical user queries, a set of historical user behaviors, and a predicted destination; querying, based on the at least one text query and the one or more context parameters, a query answer cache of the computing device to generate a query result; determining, based on the query result, whether the query answer cache includes a query answer for the at least one text query and the one or more context parameters; responsive to determining that the query answer cache does not include the query answer: sending, from the computing device to a remote computing system, an indication of the at least one text query and an indication of the one or more context parameters; and receiving, from the remote computing system, an indication of the query answer, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters; and outputting an indication of the query answer.

The details of one or more examples are set forth in the accompanying drawings and the description below. Other features, objects, and advantages of the disclosure will be apparent from the description and drawings, and from the claims.

DETAILED DESCRIPTION

Figure 1:
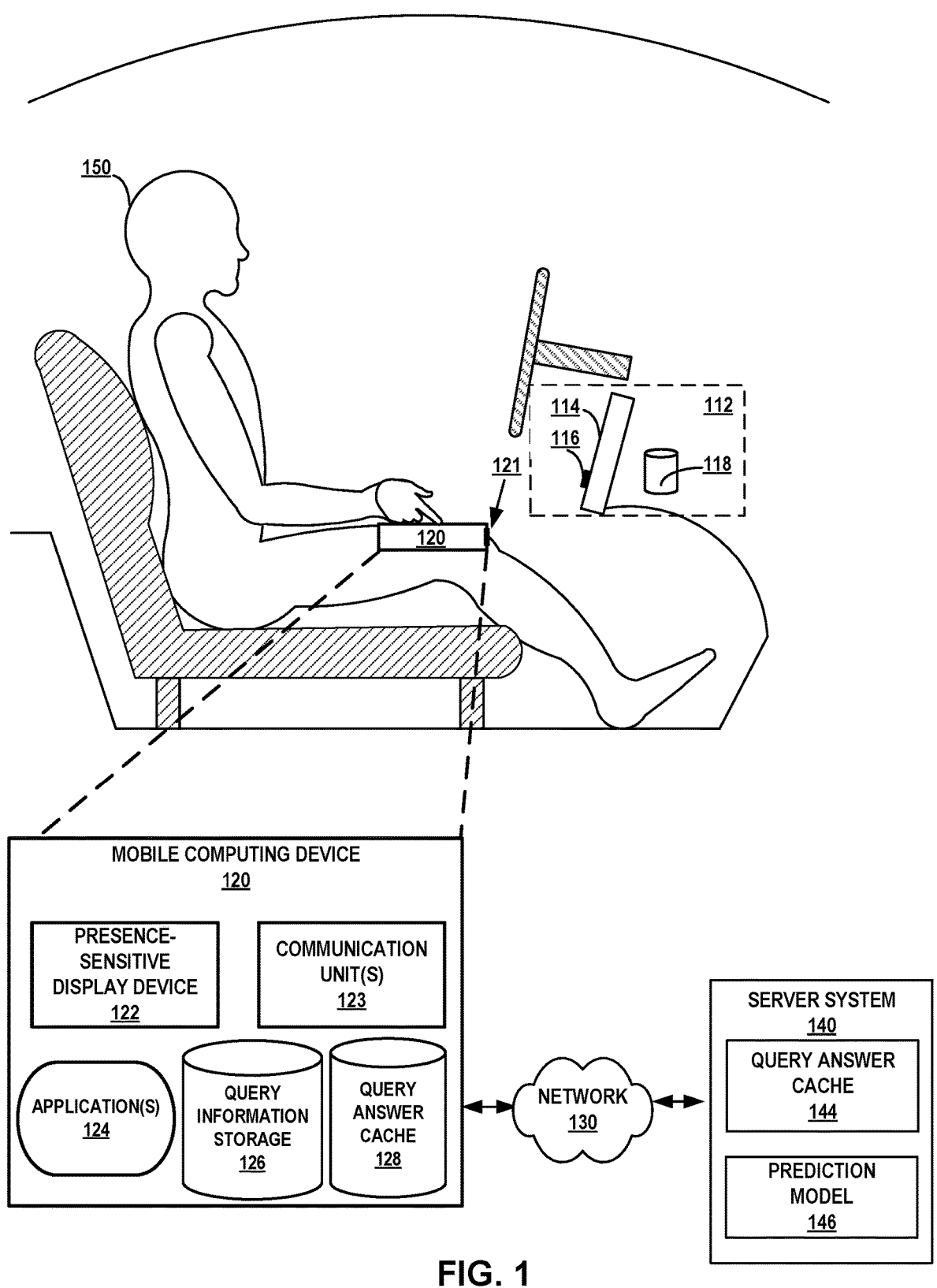
FIG. 1 is a conceptual diagram illustrating a side view of an interior of a vehicle in which an example mobile computing device is configured to provide an indication of a query answer to an example vehicle computing system, in accordance with one or more aspects of the present disclosure.

FIG. 1 is a conceptual diagram illustrating a side view of an interior of a vehicle 100 in which an example mobile computing device 120 is configured to provide an indication of a query answer to an example vehicle computing system 112 of vehicle 100, in accordance with one or more aspects of the present disclosure. FIG. 1 shows a cross-sectional view of an interior of vehicle 100 having vehicle computing system 112. Vehicle 100 may be an automobile, but aspects of the present disclosure may also be applicable to other types of vehicles, including trucks, motorcycles, aircraft, watercraft, trains, or other vehicles.

In general, vehicle computing system 112 may operate to assist, inform, entertain, or perform other tasks that require user interactions with occupants of a vehicle. Vehicle computing system 112 may be referred to as an automotive head unit, a vehicle head unit, an infotainment system, or a subcomponent thereof. For example, vehicle computing system 112 may execute various applications that perform functions or process information, on behalf of one or more occupants of the vehicle. For instance, vehicle computing system 112 may provide a navigation service that provides directions to destinations. Vehicle computing system 112 may also provide vehicle data about the vehicle, or multimedia such as audio or video. Vehicle computing system 112 may also provide an information retrieval service that provides information in response to queries. Mentioned are only a few examples of the functionality that may be provided by vehicle computing system 112, and vehicle computing system 112 may provide many additional capabilities.

In some instances, vehicle computing system 112 may have its own cellular data service and may be configured to retrieve one or more query answers (e.g., retrieve one or more query answers wirelessly from external servers) based on one or more queries. The one or more queries may be from a user 150 (e.g., via text inputs or audio inputs from user 150). In some instances, vehicle computing system 112 may not have any cellular data service, and user 150 may wish to use mobile computing device 120 to establish a data connection with vehicle computing system 112 (e.g., for searching a query). Mobile computing device 120 may have cellular connectivity and may be configured to provide one or more query answers to vehicle computing system 112 via one or more data connections, such as one or more wired or wireless data connections that enable data communication with vehicle computing system 112.

However, query answers may not be available at all times during travel. For instance, query answers may not be available when vehicle 100 and mobile computing device 120 are out of range of an internet connection.

By utilizing one or more techniques of the present disclosure, vehicle computing system 112 may provide an improved mechanism by which vehicle computing system 112 is configured to obtain one or more query answers without requiring a fast internet connection or even an internet connection at all. As will be described in further detail below, vehicle computing system 112 may receive a query (e.g., via a display device 114 or a microphone 116) and generate one or more context parameters associated with the query. Vehicle computing system 112 may further generate a query result using a query answer cache based on the received query and the one or more context parameters. The query result indicates whether the query answer cache includes a query answer for the received query.

The query answer cache may include query answers retrieved from a query answer cache of a remote computing system. The query answer cache may include predicted text queries and query answers. Each predicted query answer from predicted query answers is associated with a respective text query and a respective set of context parameters. If the query result indicates the query answer cache includes the query answer, vehicle computing system 112 may output an indication of the query answer retrieved from the query answer cache. If the query result indicates the query answer cache does not include the query answer, an indication of at least one text query and an indication of the one or more context parameters may be sent to a remote computing system to retrieve the indication of the query answer.

In some cases, an internet search may be performed in conjunction with retrieving the query result and query answer using the query answer cache. In these cases, retrieving the query answer from the query answer cache helps speed up the time vehicle computing system 112 and/or mobile computing device 120 takes to perform the internet search.

In such fashion, the disclosed techniques may improve the processing speed of vehicle computing system 112 to obtain a query answer of a query using a query answer cache, thereby potentially improving the search efficiency and power efficiency of vehicle computing system 112, as well as enabling offline search. The disclosed techniques may potentially reduce the number of processing cycles or power usage of vehicle computing system 112 by reducing or eliminating internet searching.

The query answer cache may be located on vehicle computing system 112, and/or on an external device, such as on mobile computing device 120. As shown in FIG. 1, mobile computing device 120 includes a query answer cache 128. Mobile computing device 120 further includes a presence-sensitive display device 122, communication unit(s) 123, application(s) 124, and query information storage 126. Mobile computing device 120 is configured to establish a data connection with vehicle computing system 112 to receive user input and generate a query answer based on the user input by querying query answer cache 128.

In some cases, user input may be detected via a display device 114 of vehicle computing system 112. As one example, display device 114 of vehicle computing system 112 may include a presence-sensitive screen that may receive tactile input from user 150 of vehicle computing system 112. For instance, display device 114 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Display device 114 may receive indications of the tactile input by detecting one or more inputs from user 150 of vehicle computing system 112 (e.g., the user touching or pointing to one or more locations of display device 114 with a finger. For example, display device 114 may receive text inputs that include "what is the weather" from user 150.

In some cases, the user input may be detected via a microphone 116 of vehicle computing system 112. For instance, vehicle computing system 112 may capture spoken audio data from microphone 116. In accordance with the techniques of this disclosure, vehicle computing system 112 may only capture audio using microphone 116 with explicit permissions from user 150. For example, user 150 may initiate the execution of an assistance application module, which causes display device 114 to output a graphical user interface for the assistance application module. Absent the user's explicit authorization, vehicle computing system 112 will not capture spoken audio data from microphone 116.

Responsive to detecting a user input, one or more communication units 123 of mobile computing device 120 may communicate with vehicle computing system 112 to receive the user input data. Communication units 123 may enable wired and/or wireless communication with vehicle computing system 112, including short-range wireless communication (e.g., BLUETOOTH, WIFI, or BLUETOOTH Low Energy (BLE) protocols). Mobile computing device 120 also includes one or more ports 121 (e.g., one or more Universal Serial Bus (USB) ports) coupled to communication units 123. For example, mobile computing device 120 may receive the spoken audio data from vehicle computing system 112 using a USB data pipe. Mobile computing device 120 may further determine at least one text query based at least in part on the spoken audio data. For example, vehicle computing system 112 may capture audio that includes "what is the weather" and may transmit data indicative of the captured audio to mobile computing device 120. Using speech-to-text conversion techniques, mobile computing device 120 may generate the text query "what is the weather" from the audio data.

In some cases, mobile computing device 120 may generate one or more text queries based on the spoken audio data and may provide the generated one or more text queries to display device 114 for display. Display device 114 may function as an output device using any of one or more display devices, such as a liquid crystal display (LCD), a dot matrix display, a light emitting diode (LED) display, an organic light-emitting diode (OLED) display, a micro light-emitting diode (microLED) display, an active matrix organic light-emitting diode (AMOLED) display, e-ink, or similar monochrome or color display capable of outputting visible information to a user or vehicle occupant. For example, vehicle computing system 112 may capture audio that includes "when is Emma Sherron's birthday" and mobile computing device 120 may generate two text queries "when is Emma Sherron's birthday" and "when is Emily Sherron's birthday." Mobile computing device 120 may transmit the two text queries to vehicle computing system 112 for display. User 150 may interact with display device 114 to select a text query of the one or more text queries that matches the spoken query.

Responsive to determining the text query, mobile computing device 120 may generate one or more context parameters associated with the determined text query. Examples of the one or more context parameters include, but not limited to, a current time, a current location, a current user of the mobile computing device, a set of historical user queries, a set of historical user behaviors, a predicted destination, and other suitable context parameters. For example, mobile computing device 120 may generate a text query "what is the weather" from a received audio and may generate context parameters including the current time and the current location of mobile computing device 120. Mobile computing device 120 may further store the generated context parameters in query information storage 126.

The storage of context parameters, such as current location data of mobile computing device 120 or historical user behaviors associated with user 150, may only occur, in various examples, in response to mobile computing device 120 (e.g., via presence-sensitive display device 122) receiving an affirmative consent from user 150. Presence-sensitive display device 122 may, for example, display an explicit request to the user regarding the storage and subsequent use of such data, and mobile computing device 120 may proceed to store the data only upon receiving (e.g., via presence-sensitive display device 122) an affirmative response and consent from the user.

Further to the descriptions above, user 150 may be provided with controls allowing the user to make an election as to both if and when systems, programs, or features described herein may enable collection and/storage of user information (e.g., historical user behaviors data, user location data, user identification data), and/or if and when systems, programs, or features described herein may enable transmission of content or communications between devices. In addition, certain data may be treated in one or more ways before it is stored or used, so that identifiable information is removed. For example, a user's identity may be treated so that no identifiable information can be determined for the user, or a user's geographic location may be generalized where location information is obtained (such as to a city, ZIP code, or state level), so that a particular location of a user cannot be determined. Thus, user 150 may have control over what information is collected about the user, how that information is stored and/or used, and what information is provided to the user.

In response to mobile computing device 120 generating one or more context parameters associated with a determined text query, mobile computing device 120 may query the query answer cache 128 of mobile computing device 120 to generate a query result. Query answer cache 128 may include query answers retrieved from a query answer cache 144 of server system 140. Mobile computing device 120 may use the determined text query and the one or more context parameters associated with the determined text query as inputs to output a query result, indicating whether query answer cache 128 includes a query answer for the determined text query and the one or more context parameters associated with the determined text query.

By querying query answer cache 128, mobile computing device 120 may determine whether query answer cache 128 includes a query answer for the determined text query and one or more context parameters associated with the determined text query. If the query result indicates query answer cache 128 includes the query answer, mobile computing device 120 may output an indication of the query answer to vehicle computing system 112. If the query result indicates query answer cache does not include the query answer, mobile computing device 120 may perform an internet search operation by sending an indication of the text query and an indication of the one or more context parameters associated with the determined text query to a remote computing system (e.g., to server system 140) to retrieve the indication of the query answer. Mobile computing device 120 may further transmit the indication of the query answer retrieved from the remote computing system to vehicle computing system 112. Vehicle computing system 112 may out put the indication of the query answer via display device 114 and/or microphone 116.

In some examples, a query answer may include one or more assistant commands associated with the query answer, and vehicle computing system 112 may execute one or more assistant commands with the query answer based on the received indication of the query answer. For example, if the information within query answer cache 118 and/or query answer cache 128 is stale (e.g., the answers are not accurate, not correct, or otherwise not relevant to a current time at which the query is received), vehicle computing system 112 and/or mobile computing device 120 may identify the one or more assistant commands included within the query answer cache and execute the one or more assistant commands to retrieve up-to-date information for the query. In executing the one or more assistant commands, vehicle computing system 112 may send a query to a remote computing system (e.g., server system 140) and receive a response from the remote computing system that includes a query answer.

In some instances, it is possible that mobile computing device 120 may perform an internet search operation in conjunction with on-device fetch using query answer cache 128. In these instances, mobile computing device 120 may initiate an internet search operation upon determining the text query. Mobile computing device 120 may transmit the indication of the query answer to vehicle computing system 112 once receiving the query answer via either internet search or on-device fetch. As a result, retrieving the query answer using query answer cache 128 helps speed up the time mobile computing device 120 takes to perform the internet search.

In some instances, it is possible that mobile computing device 120 and vehicle computing system 112 both have a query answer cache, such as query answer cache 128 in mobile computing device 120 and a query answer cache 118 in vehicle computing system 112. In these instances, vehicle computing system 112 may determine a text query based on a user input detected via microphone 116 and/or display device 114. Responsive to determining the text query, vehicle computing system 112 may generate one or more context parameters associated with the determined text query and query the query answer cache 118 in vehicle computing system 112 to generate a first query result. The first query result indicates whether query answer cache 118 includes a query answer for the determined text query and the one or more context parameters associated with the determined text query. Similar to query answer cache 118, query answer cache 128 may include query answers retrieved from query answer cache 144 of server system 140. If the first query result indicates query answer cache 128 does not include the query answer, vehicle computing system 112 may send an indication of the determined text query and an indication of the one or more context parameters to mobile computing device 120. Mobile computing device 120 may then query the query answer cache 118 to generate a second query result. Similar to the first query result, the second query result indicates whether query answer cache 118 includes the query answer for the determined text query. If the second query result also indicates query answer cache 118 does not include the query answer, mobile computing device 120 may then send an indication of the determined text query and an indication of the one or more context parameters to server system 140 to retrieve the indication of the query answer for the determined text query.

In various examples, query answer cache 118 and/or query answer cache 128 include query answers retrieved from a query answer cache 144 of a server system 140. For example, query answer cache 128 may be synchronized with query answer cache 144 of server system 140 via a network 130. In some cases, query answer cache 118 and/or query answer cache 128 may be synchronized with query answer cache 144 of server system 140 periodically, such as once a day, once a week, or once a month. In some cases, query answer cache 118 and/or query answer cache 128 may be synchronized with query answer cache 144 of server system 140 based on predicted lack of network connectivity. Query answer cache 144 may include predicted text queries and query answers. Each query answer stored in query answer cache 144 is associated with a respective text query and a respective set of context parameters.

In some cases, the query answers retrieved from query answer cache 144 of server system 140 include one or more global query answers generated using global query data collected from a plurality of computing devices. Server system 140 can be configured to receive search queries collected from a plurality of mobile computing devices and can determine search query samples and respective query answers based on the received search queries. For example, server system 140 may be configured to rank search queries collected from the plurality of computing devices based on search volumes in a pre-defined time period and may select one or more top-ranked search queries as the search query samples.

In some cases, the query answers retrieved from query answer cache 144 of server system 140 include one or more local query answers generated using local query data collected from mobile computing device 120 and/or vehicle computing system 112. For example, server system 140 can be configured to receive search queries collected from mobile computing device 120/or vehicle computing system 112 and can generate search query samples and respective query answers based on the search queries collected from mobile computing device 120/or vehicle computing system 112. For example, server system 140 may be configured to rank search queries collected from computing device 120/or vehicle computing system 112 based on search volumes in a pre-defined time period and may select one or more top-ranked search queries as the search query samples. In some examples, the one or more local query answers may include one or more assistant commands associated with the one or more local query answers.

In some cases, the query answers retrieved from query answer cache 144 of server system 140 include one or more predicted query answers generated using a prediction model 146. The prediction model is trained using local query data collected from mobile computing device 120/or vehicle computing system 112. For example, the prediction model can be a machine learning model that takes search queries collected from computing device 120/or vehicle computing system 112 and context parameters associated with search queries as inputs and outputs one or more queries that are likely to be searched by user 150 of mobile computing device 120/or vehicle computing system 112.

In such fashion, the disclosed techniques may improve the processing speed of vehicle computing system 112 to obtain a query answer of a query using a query answer cache, thereby potentially improving the search efficiency and power efficiency of vehicle computing system 112, as well as enabling offline search. The disclosed techniques may potentially reduce the number of processing cycles or power usage of vehicle computing system 112 by reducing or eliminating internet searching.

Figure 2:
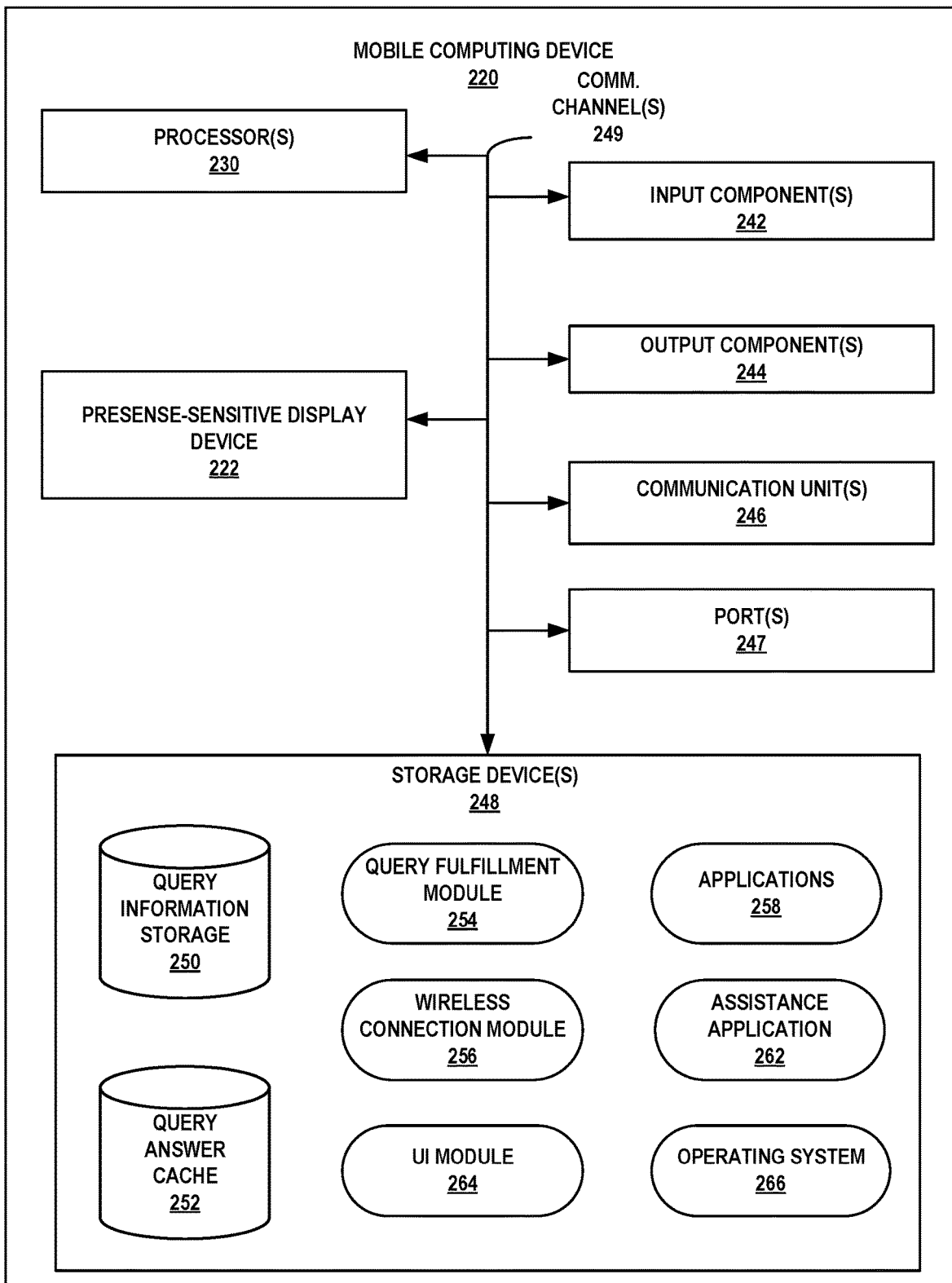
FIG. 2 is a block diagram illustrating further details of an example mobile computing device that is configured to provide an indication of a query answer to an example vehicle computing system, in accordance with one or more aspects of the present disclosure.

FIG. 2 is a block diagram illustrating an example mobile computing device 220 that is configured to provide an indication of a query answer to an example vehicle computing system, in accordance with one or more aspects of the present disclosure. Mobile computing device 220 may, in some cases, be a more detailed example of mobile computing device 120 of FIG. 1. FIG. 2 illustrates only one particular example of mobile computing device 220, and many other examples of mobile computing device 220 may be used in other instances. In various cases, mobile computing device 220 may include a subset of the components shown in FIG. 2 or may include additional components not shown in FIG. 2.

In the example of FIG. 2, mobile computing device 220 includes presence-sensitive display device 222, one or more processors 230, one or more input components 242, one or more communication units 246, one or more output components 244, and one or more storage devices 248. Communication channels 249 may interconnect each of the components 221, 222, 230, 242, 244, 246, and/or 248 for inter-component communications (physically, communicatively, and/or operatively). In some examples, communication channels 249 may include a system bus, a network connection, an inter-process communication data structure, or any other method for communicating data between hardware and/or software.

One or more input components 242 of mobile computing device 220 may receive input, such as input from a user. Examples of input are touch/tactile, presence-sensitive, and audio input. Examples of input components 242 include a presence-sensitive screen, touch-sensitive screen, touchscreen, mouse, keyboard, trackpad, voice responsive system, video camera, microphone or any other type of device for detecting input from a human or machine.

One or more output components 244 of mobile computing device 220 may generate output. Examples of output are haptic, audio, and visual output. Examples of output components 244 include a presence-sensitive screen, a touch-sensitive screen, a touchscreen, a sound card, a video graphics adapter card, a speaker, a liquid crystal display (LCD), an organic light-emitting diode (OLED) display, a micro light-emitting diode (microLED) display, an active matrix organic light-emitting diode (AMOLED) display, or any other type of device for generating output to a human or machine.

One or more communication units 246 of mobile computing device 220 may communicate with external devices via one or more networks by transmitting and/or receiving network signals on the one or more networks (e.g., one or more wired and/or wireless networks). For example, mobile computing device 220 may use communication units 246 to transmit and/or receive radio signals on a radio network such as a cellular radio network. Likewise, communication units 246 may transmit and/or receive satellite signals on a satellite network such as a global positioning system (GPS) network. Examples of communication units 246 include a network interface card (e.g., such as an Ethernet card), an optical transceiver, a radio frequency transceiver, a GPS receiver, or any other type of device that can send and/or receive information. Other examples of communication units 246 may include short wave radios, cellular data radios, wireless Ethernet network radios, as well as universal serial bus (USB) controllers.

Mobile computing device 220 includes, among other things, a presence-sensitive display device 222 and one or more ports 247 (e.g., USB port). Similar to the description above in reference to FIG. 1, mobile computing device 220 may establish a wired communication with a vehicle computing system.

One or more storage devices 248 within computing device 200 include query information storage 250 and query answer cache 252. Storage devices 248 may store information for processing during operation of mobile computing device 220 (e.g., during execution of one or more of query fulfillment module 254, wireless connection module 256, applications 258, assistance application 262, UI module 264 and/or operating system 266). For example, assistance application 262 of mobile computing device 220 may generate one or more context parameters associated with a text query and may store the one or more context parameters in information storage 250. Similar to the description above in reference to FIG. 1, query answer cache 252 may include predicted queries and query answers retrieved from a query answer cache of a remote computing system.

In some examples, storage devices 248 include temporary memory, meaning that a primary purpose of storage devices 248 is not long-term storage. Storage devices 248 on mobile computing device 220 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 248, in some examples, include one or more computer-readable storage media. Storage devices 248 may be configured to store larger amounts of information than volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with one or more query fulfillment module 254, wireless connection module 256, applications 258, assistance application 262, UI module 264, and/or operating system 266. In some examples, one or more of query fulfillment module 254, wireless connection module 256, applications 258, assistance application 262, UI module 264, and/or operating system 266. In other cases, one or more of query fulfillment module 254, wireless connection module 256, applications 258, assistance application 262, UI module 264, and/or operating system 266 may be stored remotely in the cloud (e.g., at one or more external servers).

In various cases, query fulfillment module 254 may store data in, or retrieve data from, query information storage 250 and/or query answer cache 252. The storage of user data, such as location information or identification information associated with a user, may only occur, in various examples, in response to mobile computing device 220 (e.g., via UI module 264) receiving an affirmative consent from the user. UI module 264 may, for example, provide an explicit request to the user regarding the storage and subsequent use of such data, and mobile computing device 220 may proceed to store the data locally only upon receiving an affirmative response and consent from the user.

Wireless connection module 256 may be configured to control wireless connection events and/or operations for mobile computing device 220. Wireless connection module 256 may, in various cases, establish one or more wireless connections with one or more external devices or systems. In certain cases, wireless connection module 256 may store the unique identifiers of external devices or systems with which it has established a wireless connection, as well as any other information associated with these connections (e.g., connection identifiers, protocol identifiers, port identifiers, connection passwords or keys, timestamps, pairing information, and the like).

One or more processors 230 may implement functionality and/or execute instructions within mobile computing device 220. For example, processors 230 on mobile computing device 220 may receive and execute instructions stored by storage devices 248 that execute the functionality of query fulfillment module 254, wireless connection module 256, applications 258, assistance application 262, UI module 264, and/or operating system 266. These instructions executed by processors 230 may cause mobile computing device 220 to store information within storage devices 248 during program execution. Processors 230 may execute instructions of query fulfillment module 254, wireless connection module 256, applications 258, assistance application 262, UI module 264, and/or operating system 266 to perform one or more operations. That is, query fulfillment module 254, wireless connection module 256, applications 258, assistance application 262, UI module 264, and/or operating system 266 may be operable by processors 230 to perform various functions described herein.

In some examples, mobile computing device 220 may only comprise or otherwise include processors 230. In such examples, one or more of input components 242, presence-sensitive display device 222, communication units 246, output components 244, and storage devices 248 may be external to, yet communicatively coupled with (e.g., via communication channels 249), mobile computing device 220.

In some examples, computing device 200 may predict future usage of assistance application 262. The future usage may include one or more queries predicted to be received by assistance application 262 and a time range during which assistance application 262 is predicated to receive at least one of the one or more queries (e.g., receive a user input during a particular portion of a day, such as between 8 am and 5 pm). In various instances, computing device 200 may predict future usage based on prior usage. That is, computing device 200 may maintain an assistance application usage history and/or query history. Such histories may be user-specific, device-specific, cross-device, or crowd-sourced (e.g., including information from other users such as those who may have a similar profile to a current user of computing device 200). Based on that history, computing device 200 may identify particular time ranges (e.g., day of week, time of day, part of a month, part of a year, etc.) where a user has previously used assistance application 262 and/or requested various queries. For example, a user may periodically execute assistance application 262 and ask "what is the weather going to be like today" around 8 am each weekday and at 9 am each weekend. Based on this usage history, computing device 200 may predict that the user of computing device 200 will query the weather for the day each morning between 7 and 10 am or weekdays between 7 and 9 am and weekends between 8 and 10 am, as examples. In some examples, predicted queries and query answers may include time sensitive information. For example, a user may periodically execute assistance application 262 and ask "what is the weather right now" around 8 am each day. Based on this usage history, computing device 200 may predict that the user of computing device 200 will query the weather around 8 am each morning. By predicting queries and query answers that a user is predicted to ask, computing device 220 enhances traditional offline query support as it may provide more detailed information.

Computing device 200 may periodically update query answer cache 252 based on the predicted future usage of assistance application 262. For example, based on the predicted future usage of assistance application 262, computing device 200 may update query answer cache 252 by retrieving predicted queries and query answers from a query answer cache of a remote computing system. In the example where computing device 200 predicts that the user will query the weather for the day between 7 and 9 am during the week, computing device 200 may updated query answer cache 252 prior to 7 am (e.g., at 5 am, 6 am, 6:59 am, etc.) to retrieve a weather forecast for the day.

In some examples, computing device 200 may predict network connectivity state of computing device 200 based on the predicted future usage of the assistance application 262, such as predict assistance application 262 may receive a user input during a particular portion of a day (e.g., between 8 and 9 am). Computing device 200 may further determine whether the predicted network connectivity state is indicative of computing device 200 having network connectivity based on the time range during which assistance application 262 is predicted to receive the user input.

In predicting the future network connectivity state, computing device 200, with explicit user permission, may maintain a network connectivity history that includes one or more of a status of a network connection, a location of computing device 200 (e.g., a zip code, a geographical region, a GPS coordinate, etc.), date information, and time information. As one example, a user may periodically go to a sandwich shop for lunch. Along the path to the sandwich shop, computing device 200 has a low quality (e.g., weak wireless signal, reduced data transfer rates, etc.) network connection or a loss of network connectivity. Further, while traveling to this sandwich shop, the user may execute assistance application 262 and query for the day's top news headlines. Typically, the query may fail due to the low quality or lack of network connectivity. However, by using techniques of this disclosure, computing device 200 may predict the low quality and/or lack of network connectivity and proactively update query answer cache 252 to include information about the top news headlines. That is, based on determining the predicted network connectivity state is indicative of computing device 200 not having network connectivity during the time range, computing device 200 may proactively update query answer cache 252 by retrieving predicted queries and query answers from a query answer cache of a remote computing system prior to the occurrence of the predicted problematic network connectivity state.

Figure 3:
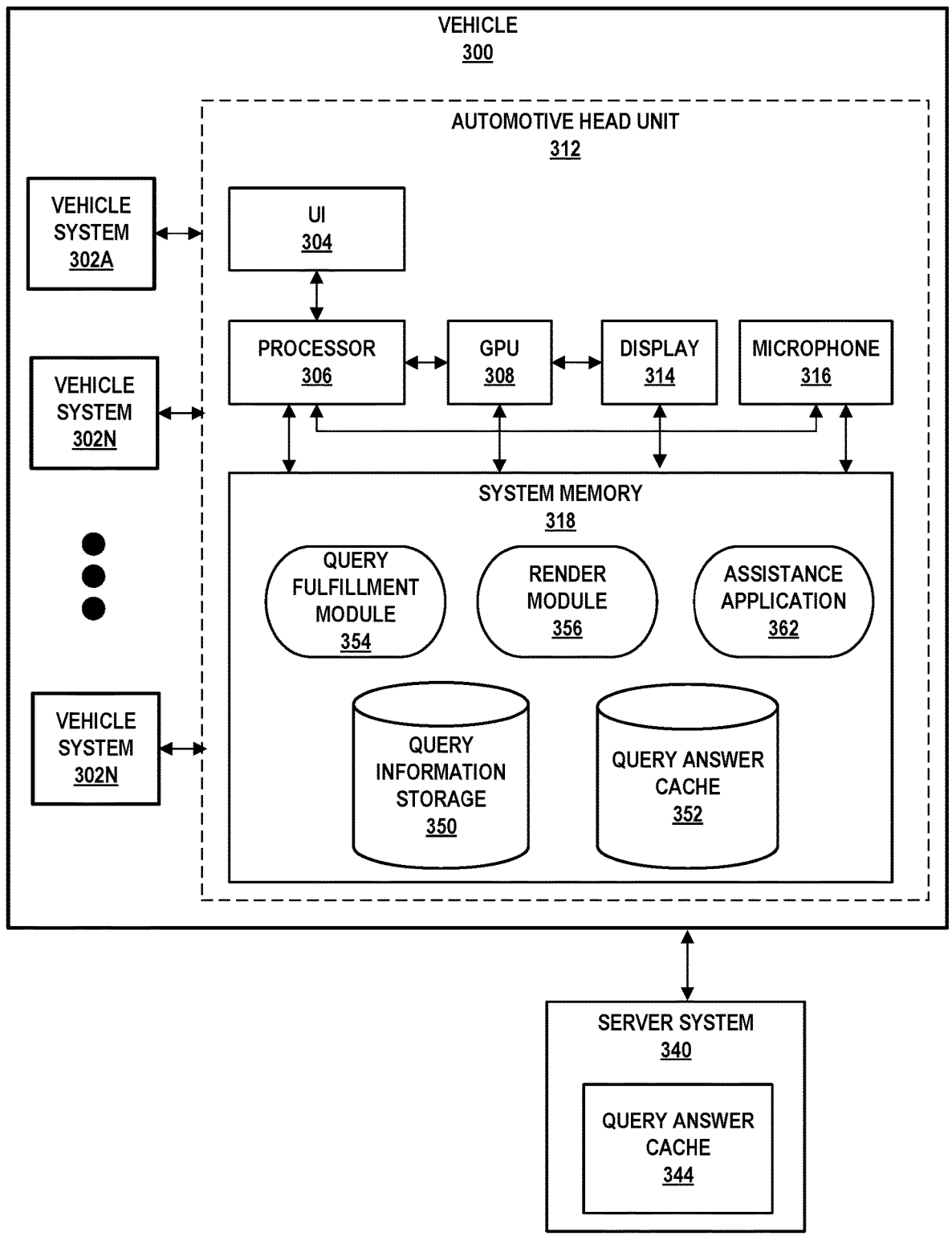
FIG. 3 is a conceptual diagram illustrating an example vehicle computing system configured to generate an indication of a query answer, in accordance with one or more aspects of the present disclosure.

FIG. 3 is a conceptual diagram illustrating an example automotive head unit 312 configured to generate an indication of a query answer, in accordance with one or more aspects of the present disclosure. Automotive head unit 312 may, in some cases, be a more detailed example of vehicle computing system 112 of FIG. 1. FIG. 3 illustrates only one particular example of automotive head unit 312, and many other examples of automotive head unit 312 may be used in other instances. In various cases, automotive head unit 312 may include a subset of the components shown in FIG. 3 or may include additional components not shown in FIG. 3.

In the example of FIG. 3, vehicle 300 includes a processor 306, a graphics processing unit (GPU) 308, and system memory 318. In some examples, processor 306, GPU 308, and a transceiver module (not shown in FIG. 3) may be formed as an integrated circuit (IC). For example, the IC may be considered as a processing chip within a chip package, and may be a system-on-chip (SoC).

Examples of processor 306, and GPU 308 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 306 may represent a central processing unit (CPU) of vehicle 300. In some examples, GPU 308 may be specialized hardware that includes integrated and/or discrete logic circuitry that provides GPU 308 with massive parallel processing capabilities suitable for graphics processing. In some instances, GPU 308 may also include general purpose processing capabilities, and may be referred to as a general purpose GPU (GPGPU) when implementing general purpose processing tasks (i.e., non-graphics related tasks). Although shown as a dedicated GPU 308, GPU 308 may represent an integrated GPU that is integrated into the underlying circuit board (such as a so-called "motherboard"), or otherwise incorporated into processor 306.

Processor 306 may execute various types of applications. Examples of the applications include web browsers, e-mail applications, spreadsheets, video games, or other applications that generate viewable objects for display. System memory 318 may store instructions for execution of the one or more applications. The execution of an application by processor 306 causes processor 306 to produce graphics data for image content that is to be displayed. Processor 306 may transmit graphics data of the image content to GPU 308 for further processing based on instructions or commands that processor 306 transmits to GPU 308.

Processor 306 may communicate with GPU 308 in accordance with an application programming interface (API). Moreover, the techniques described in this disclosure are not required to function in accordance with an API, and processor 306 and GPU 308 may utilize any technique for communicating with GPU 308.

System memory 318 may represent a memory for vehicle 300. System memory 318 may include a query information storage 350 and a query answer cache 352. System memory 318 may comprise one or more computer-readable storage media. Examples of system memory 318 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 318 may include instructions that cause processor 306 to perform the functions ascribed in this disclosure to processor 306. Accordingly, system memory 318 may be a non-transitory computer-readable storage medium having instructions stored thereon that, when executed, cause one or more processors (e.g., processor 306) to perform various functions.

System memory 318 is a non-transitory storage medium. The term "non-transitory" indicates that the storage medium is not embodied in a carrier wave or a propagated signal. However, the term "non-transitory" should not be interpreted to mean that system memory 318 is non-movable or that its contents are static. As one example, system memory 318 may be removed from vehicle 300, and moved to another device. As another example, memory, substantially similar to system memory 318, may be inserted into autonomous vehicle 300. In certain examples, a non-transitory storage medium may store data that can, over time, change (e.g., in RAM).

As further shown in the example of FIG. 3, vehicle 300 may include a display 314, a microphone 316, and a user interface 304. Display 314 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 314, vehicle 300 may include a number of displays that may be positioned throughout a cabin of vehicle 300. In some examples, passive versions of display 314 or certain types of active versions of display 314 (e.g., OLED displays) may be integrated into seats, tables, roof liners, flooring, windows (or in vehicles with no windows or few windows, walls) or other aspects of the cabin of vehicles. When display 314 represents a passive display, display 314 may also include a projector or other image projection device capable of projecting or otherwise recreating an image on passive display 314. Furthermore, display 314 may include displays integrated into driver-side dashboards that virtually represent physical instrument clusters (showing speed, revolutions, engine temperature, etc.).

User interface 304 may represent any type of physical or virtual interface with which a user may interface to control various functionalities of vehicle 300. User interface 304 may include physical buttons, knobs, sliders or other physical control implements. User interface 304 may also include a virtual interface whereby an occupant of vehicle 300 interacts with virtual buttons, knobs, sliders or other virtual interface elements via, as one example, a touch-sensitive screen, or via a touchless interface. The occupant may interface with user interface 304 to control one or more of a climate within vehicle 300, audio playback by vehicle 300, video playback by vehicle 300, transmissions (such as cellphone calls) through vehicle 300, or any other operation capable of being performed by vehicle 300.

User interface 304 may also represent interfaces extended to display 314 when acting as an extension of or in place of a display integrated into vehicle 300. That is, user interface 304 may include virtual interfaces presented via a heads-up display (HUD), augmented reality computing device, virtual reality computing device or display, tablet computer, or any other of the different types of extended displays listed above.

In the example of FIG. 3, processor 306, GPU 308, system memory 318, display 314, and UI 304 may collectively represent, at least in part, what is referred to as an automotive vehicle head unit (AHU) 312 in the automotive context. AHU 312 may represent any integrated or separate computing device capable of interfacing with various aspects of vehicle 300 and/or providing entertainment for occupants and/or information regarding vehicle 300 (where such head units may be referred to as "infotainment units" or "infotainment systems").

As further shown in the example of FIG. 3, vehicle 300 may include a number of different vehicle systems 302A-302N ("vehicle systems 302"). Vehicle systems 302 may include a heating, ventilation, air conditioning (HVAC) system or a temperature regulation system (e.g., which may include heated and/or cooled seats in addition to the HVAC system) (either or both of which may also be referred to as a climate system herein), a lighting system (for providing interior and/or exterior lighting), a seat control system (for adjusting a position of occupant seating), a mirror control system (for controlling interior and/or exterior mirrors, including rearview mirrors, side mirrors, visor mirrors, etc.), a windshield wiper control system, an entertainment system (for controlling radio playback, video playback, image display, etc.), a safety assistant system (for controlling parking assistance, back-up assistance, etc.), a drive mode system (for controlling the suspension, transmission, etc.) a sun-/moon-roof control system (for controlling sunroofs and/or moonroofs), and any other type of vehicle system capable of control via a head unit, such as AHU 312. An example of vehicle systems 302 may include an electronic control unit (ECU), which may control any of the foregoing examples of vehicle systems 302.

In accordance with various aspects of the techniques described in this disclosure, AHU 312 is configured to detect a user input and generate a query answer based on the user input by querying query answer cache 352. System memory 318 may store information for processing during operation of AHU 312 (e.g., during execution of one or more of query fulfillment module 354, wireless connection module 356, and assistance application 362).

In operation, AHU 312 may detect a user input via microphone 316 and/or UI 304 and may determine a text query based on the detected user input. Responsive to determining the text query, AHU 312 may generate one or more context parameters associated with the text query and store the generated context parameters in query information storage 350.

Responsive to AHU 312 generating one or more context parameters associated with the text query, query fulfillment module 354 may take the text query and the one or more context parameters associated with the text query and output one or more query answers. Query fulfillment module 354 may generate the one or more query answers via interne search and/or on-device fetch.

In some examples, query fulfillment module 354 may send an indication of the at least one text query and an indication of the one or more context parameters to a remote computing system (e.g., server system 340) to retrieve an indication of a query answer.

In some examples, rather than directly retrieve a query answer by querying a remote computing system, query fulfillment module 354 may retrieve the query answer from query answer cache 352. Query answer cache 352 may include predicted queries and query answers retrieved from a query answer cache (e.g., query answer cache 344) of a remote computing system (e.g., server system 340). For example, AHU 312 may predict that a user will query the weather for the day based on historical data on the text queries and may pre-fetch a weather forecast for the day from query answer cache 344 of server system 340 to updated query answer cache 352.

Responsive to retrieving the query answer from query answer cache 352, render module 356 may render the retrieved query answer to generate an indication of the query answer for output via display 314 and/or microphone 316. For example, render module 356 may render the retrieved query answer to allow the retrieved query answer to be scaled and encoded into a known format. In addition, render module 356 may further generate a two-dimensional (2D) or a three-dimensional (3D) graphical view of the retrieved query answer. For example, in the example where retrieved query answer indicates a storm, render module 356 may generate a storm symbol for display via display 314.

Figure 4:
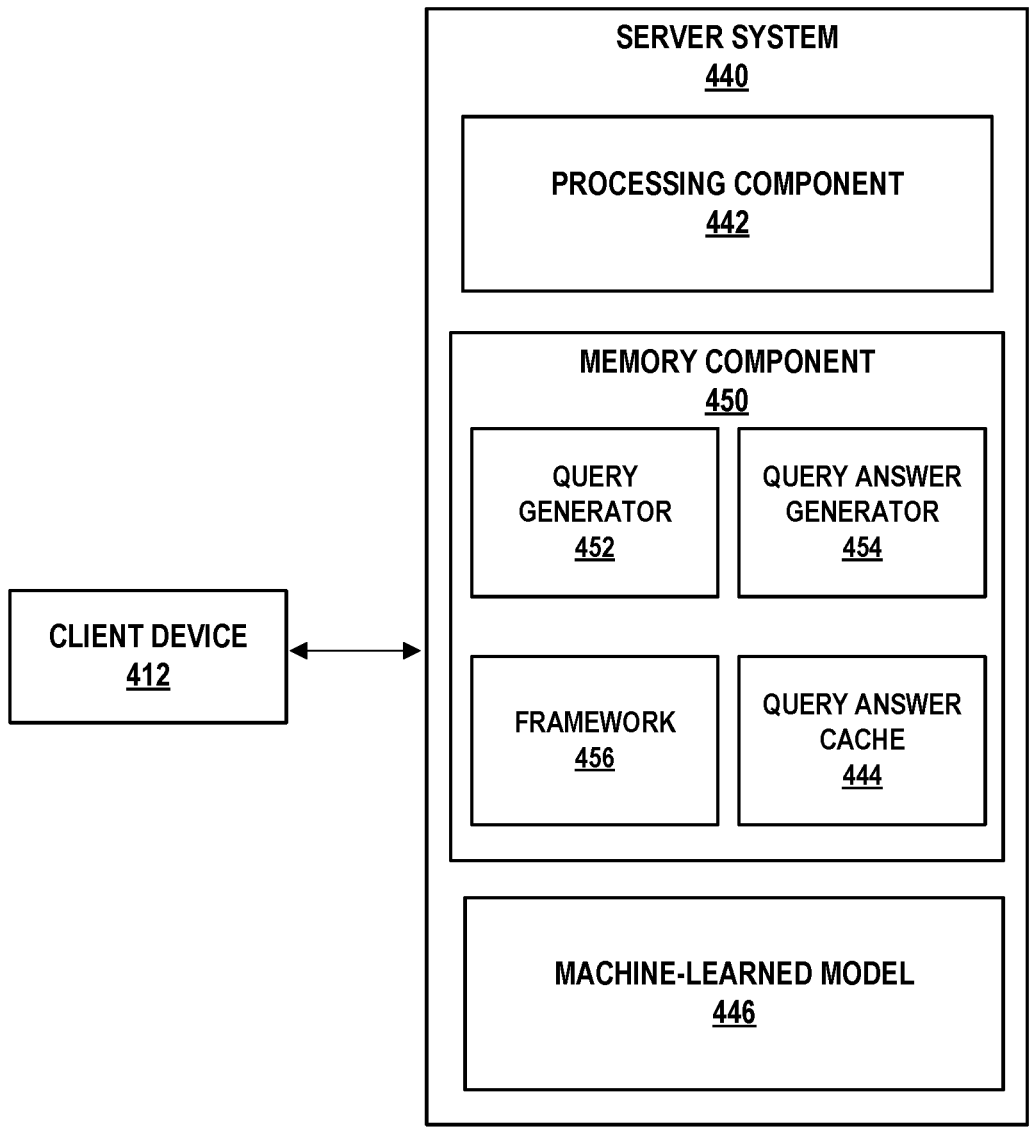
FIG. 4 is a conceptual diagram illustrating an example remote computing system configured to generate and communicate queries and query answers with an example client computing device, in accordance with one or more aspects of the present disclosure.

FIG. 4 is a conceptual diagram illustrating an example remote computing system configured to generate and communicate queries and query answers with an example client computing device, in accordance with one or more aspects of the present disclosure. FIG. 4 includes client device 412 communicating with remote computing system 440. Client device 412 is an example of vehicle computing system 112 of FIG. 1, mobile computing device 120 of FIG. 1, mobile computing device 220 of FIG. 2, and/or an example of AHU 312 of FIG. 3. Remote computing system 440 is an example server system 140 of FIG. 1, and/or an example server system 340 of FIG. 3.

In the example of FIG. 4, remote computing system 440 includes a processing component 442, a memory component 450, and machine-learned model 446. Machine-learned model 446, as referenced below, may be an example of any model used by a query generator 452 to generate one or more queries.

In some examples, machine-learned model 446 is trained to receive input data of one or more types and, in response, provide output data of one or more types. The input data may include search queries collected from a plurality of computing devices, search queries collected from client device 412, context parameters associated with the search queries collected from client device 412.

Machine-learned model 446 may output one or more global queries. In some examples, machine-learned model 446 may generate, given search queries collected from a pooled population, one or more global queries that are most likely to be searched by the pooled population. For example, machine-learned model 446 may use search queries collected from a plurality of mobile computing devices as inputs and may output one or more global queries based on search volumes of the received search queries, e.g., output one or more top-ranked search queries as the global queries.

In some examples, machine-learned model 446 may output one or more local queries. Machine-learned model 446 may use search queries collected from client device 412 as inputs and may generate one or more local queries based on the search queries collected from client device 412. For example, machine-learned model 446 may rank search queries collected from client device 412 based on search volumes in a pre-defined time period and may output one or more top-ranked search queries as the local queries.

In some examples, machine-learned model 446 may output one or more predicted queries. For example, machine-learned model 446 may use search queries and context parameters associated with search queries collected from client device 412 as inputs and may generate one or more predicted queries that are likely to be searched by a user of client device 412. As an example, a user may periodically retrieve a weather forecast of the day during the week. Based on this usage history, machine-learned model 446 may generate one or more predicted queries, such as "what is the weather going to be like today" and "what is the weather going to be like tomorrow."

Machine-learned model 446 can be or include one or more of various different types of machine-learned models. In some examples, machine-learned model 446 may include one or more other forms of artificial neural networks such as, for example, deep Boltzmann machines; deep belief networks; stacked autoencoders; etc. Any of the neural networks described herein can be combined (e.g., stacked) to form more complex networks. In some examples, machine-learned model 446 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some examples, centralized training techniques may be used to train machine-learned model 446 (e.g., based on a centrally stored dataset). This process may repeat over time. As such, machine-learned model 446 may become more and more accurate and may be pushed to all client devices which have the same assistance application installed. In other examples, decentralized training techniques such as distributed training, federated learning, or the like can be used to train, update, or personalize machine-learned model 446. Decentralized training allows for machine-learned model 446 to be improved based on real usage in a privacy-friendly way.

Query generator 452 may provide the queries generated by machine-learned model 446 to a query answer generator 454 to generate query answers and context parameters associated with the queries. Query answer generator 454 may further provide queries, query answers and context parameters associated with the queries to framework 456. Framework 456 may receive and store queries, query answers and context parameters associated with the queries into a query answer cache 444. For example, framework 456 may encode query answers and context parameters associated with the queries into a known format and store the encoded query answers and context parameters into query answer cache 444.

While described with respect to remote computing system 440, mobile device 120, vehicle computing system 112, mobile device 220 or AHU 312 may proactively predict queries and proactively fetches query answers to those predicted queries. For example, vehicle computing system 112 or mobile device 120 may predict queries and query answers that user 150 is predicted to ask based on in-vehicle data and store the predicted quires and query answers in a local query answer cache. In this way, various aspects of the techniques may enable vehicle computing system 112 or mobile device 120 to use a local query answer cache to retrieve query answers, thereby enhancing traditional offline query support.

Figure 5:
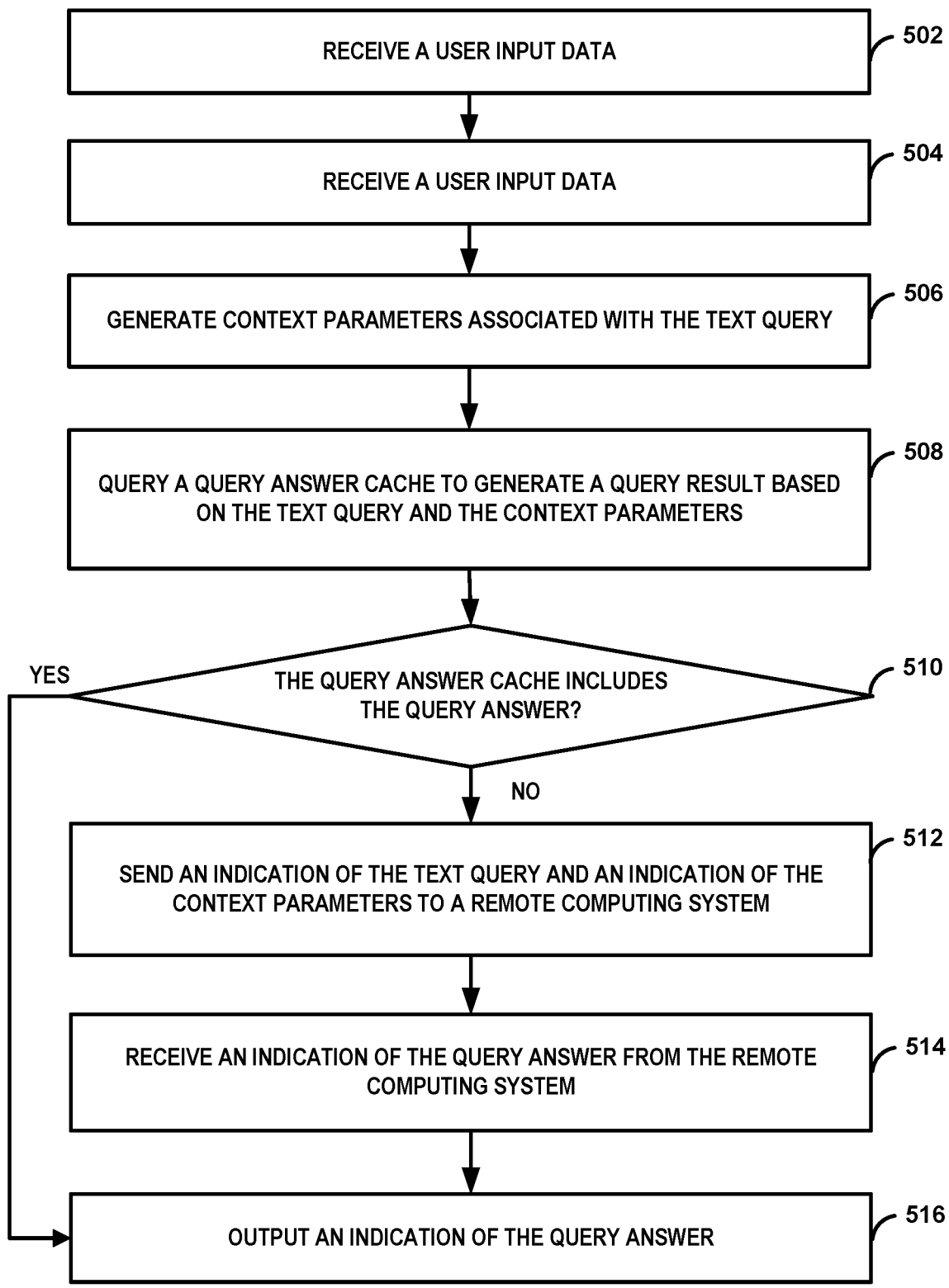
FIG. 5 is a flowchart illustrating example operations performed by a mobile computing device, in accordance with one or more aspects of the present disclosure.

FIG. 5 is a flowchart illustrating example operations of a computing device configured in accordance with one or more aspects of the present disclosure. The computing device may be any of the computing devices illustrated in FIGS. 1-3. For purposes of illustration only, the operations of FIG. 5 are described with reference to automotive head unit (AHU) 312 shown in FIG. 3.

As shown in FIG. 5, AHU 312 may receive user input data (e.g., via UI 304, display 314, and/or microphone 316) (502). For example, AHU 312 may receive tactile input via display 314 that includes "what is the weather" and may generate the text query "what is the weather" based on the received tactile input. AHU 312 may determine at least one text query based at least in part on the user input data (504). For example, AHU 312 may receive audio input via microphone 316 that includes "what is the weather" and may use speech-to-text conversion techniques to generate the text query "what is the weather" from the audio data.

Responsive to determining the at least one text query, AHU 312 may generate one or more context parameters associated with the at least one text query (506). The one or more context parameters include at least one of a current time, a current location, a current user of the computing device, a set of historical user queries, a set of historical user behaviors, and a predicted destination. In the example where AUH 312 generates a text query "what is the weather," AUH 312 may generate the current time and the current location of AUH 312 as the context parameters.

AHU 312 may query, based on at least one text query and the one or more context parameters, query answer cache 352 to generate a query result (508). Query answer cache 352 may include queries and query answers retrieved from query answer cache 344 of server system 340, thereby enabling AHU 312 to respond to the detected queries even when AHU 312 do not have internet connectivity. In some examples, queries retrieved from query answer cache 344 may include one or more global queries that are most likely to be searched by a pooled population. In some examples, queries retrieved from query answer cache 344 may include one or more local queries that are searched by the user of AHU 312. In some examples, queries retrieved from query answer cache 344 may include one or more predicted queries that are likely to be searched by user of AHU 312. For example, the one or more predicted queries may be generated using a prediction model trained using local query data collected from AHU 312.

AHU 312 may determine, based on the query result, whether query answer cache 352 includes a query answer for at least one text query and the one or more context parameters (510). Responsive to determining that query answer cache 352 does not include the query answer ("NO" branch of 510), AHU 312 may send (512), an indication of the at least one text query and an indication of the one or more context parameters, to server system 340 to retrieve the query answer. AHU 312 may receive, from server system 340, an indication of the query answer (514). AHU 312 may further output (e.g., via display 314 and/or microphone 316) the indication of the query answer (516). For example, AHU 312 may use render module 356 to render the query answer to allow the query answer to be scaled and encoded into a known format. As another example, AHU 312 may use render module 356 to generate a graphical view of the query answer.

Responsive to determining that query answer cache 352 includes the query answer ("YES" branch of 510), AHU 312 may output the indication of the query answer. In some examples, AHU 312 may output the indication of the query answer via display 314. In other examples, AHU 312 may output the indication of the query answer via microphone 316.

Figure 6:
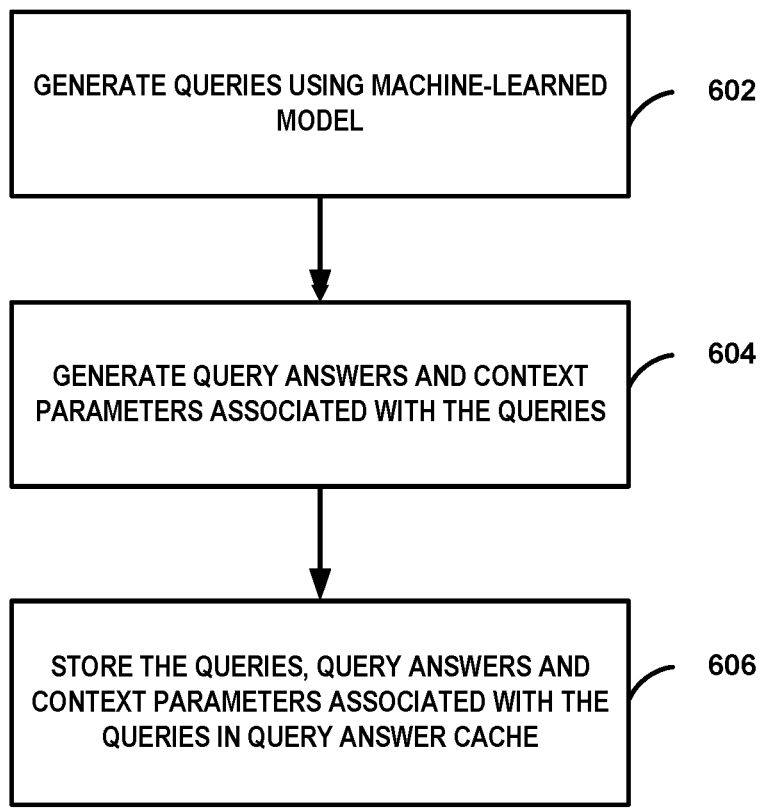
FIG. 6 is a flowchart illustrating example operations performed by a remote computing system, in accordance with one or more aspects of the present disclosure.

FIG. 6 is a flowchart illustrating example operations of a server system configured in accordance with one or more aspects of the present disclosure. The server system may be any of such as any of the server systems illustrated in FIGS. 1 and 3 or the remote computing system illustrated in FIG. 4, in accordance with one or more aspects of the present disclosure. For purposes of illustration only, the operations of FIG. 5 are described with reference to remote computing system 440 shown in FIG. 3.

As shown in FIG. 6, query generator 452 of remote computing system 440 may generate queries using machine-learned model 446 (602). Machine-learned model 446 may receive one or more inputs, such as search queries collected from a plurality of computing devices, search queries collected from client device 412, and context parameters associated with the search queries collected from client device 412. Based on the one or more inputs, machine-learned model 446 may generate one or more queries, such as one or more global queries, one or more local queries, and one or more predicted queries. In some examples, machine-learned model 446 may generate one or more global queries that are most likely to be searched by a pooled population based on search queries collected from a plurality of computing devices. In some examples, machine-learned model 446 may generate one or more local queries that are searched by a user of client device 412 based on search queries collected from client device 412. In some examples, machine-learned model 446 may further generate one or more predicted queries that are likely to be searched by user of client device 412 based on search queries collected from client device 412.

Query answer generator 454 of remote computing system 440 may generate, based on the one or more queries, query answers and context parameters associated with the one or more queries (604). For example, query answer generator 454 may generate the one or more query answers via internet search.

Framework 456 of remote computing system 440 may further store the one or more queries, query answers and context parameters associated with the one or more queries into query answer cache 444 (606). For example, framework 456 may encode the queries, query answers and context parameters associated with the queries into a known format and store the encoded queries, query answers and context parameters into query answer cache 444.

In one or more examples, the functions described may be implemented in hardware, hardware and software, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   executing, by a computing device, an assistance application, wherein the assistance application generates one or more current context parameters and queries a query answer cache;
   predicting, by the computing device, future usage of the assistance application, wherein the future usage includes one or more queries predicted to be received by the assistance application and a time range during which the assistance application is predicted to receive at least one of the one or more queries;
   predicting, by the computing device and based on the predicted future usage of the assistance application, a network connectivity state of the computing device;
   determining, by the computing device and based on the time range, whether the predicted network connectivity state is indicative of the computing device having network connectivity;
   responsive to determining that the predicted network connectivity state is indicative of the computing device not having network connectivity during the time range:
      predicting, by the computing device, a plurality of predicted queries predicted to be received by the assistance application during the time range, wherein each predicted query from the plurality of predicted queries is associated with a respective set of context parameters, wherein the respective set of context parameters include at least one of a set of historical user queries for a user of the computing device, a set of historical user behaviors of the user of the computing device, and a first predicted destination;
      prefetching, by the computing device and based on the plurality of predicted queries, at least one predicted query answer; and
      storing, in the query answer cache of the computing device, the at least one predicted query answer, an indication of a predicted query associated with the at least one predicted query answer, and an indication of the respective set of context parameters associated with the predicted query associated with the at least one predicted query answer;
   receiving, by the computing device, a user input;
   determining, by the computing device and based at least in part on the user input, at least one text query;
   responsive to determining the at least one text query, generating, by the computing device, one or more current context parameters associated with the at least one text query, the one or more current context parameters including one or more of a current time, a current location, a current user of the computing device, and a second predicted destination;
   querying, by the computing device and based on the at least one text query and the one or more current context parameters, the query answer cache to generate a query result;
   determining, based on the query result, whether the query answer cache includes a query answer for the at least one text query and the one or more current context parameters, wherein the query answer cache includes the query answer for least at least one text query when the at least one text query and the one or more current context parameters match a predicted query from the plurality of predicted queries and the respective set of context parameters associated with the predicted query from the plurality of predicted queries;
   responsive to determining that the query answer cache includes the query answer, determining that the query result is the query answer; and
   outputting, by the computing device, an indication of the query answer.

2. The method of claim 1, wherein receiving the user input further comprises:
   receiving spoken audio data from a head unit of a vehicle, wherein the spoken audio data is detected via a microphone of the vehicle.

3. The method of claim 2, wherein the computing device is a mobile computing device connected to the head unit of the vehicle, and wherein the spoken audio data is sent to the mobile computing device from the head unit.

4. The method of claim 1, wherein receiving the user input further comprises:
   receiving tactile input from a head unit of a vehicle, wherein the tactile input is detected via a touch sensitive screen of the vehicle.

5. The method of claim 1, further comprising:
   periodically updating, by the computing device and based on the predicted future usage of the assistance application, the query answer cache.

6. The method of claim 1, further comprising:
   responsive to determining that the query answer cache does not include the query answer:
      sending, from the computing device to a remote computing system, an indication of the at least one text query and an indication of the one or more context parameters; and
      receiving, from the remote computing system, an indication of the query answer, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters.

7. The method of claim 6, wherein the query answer retrieved from the query answer cache of the remote computing system comprises one or more global query answers generated using global query data, wherein global query data are collected from a plurality of computing devices.

8. The method of claim 6, wherein the query answer retrieved from the query answer cache of the remote computing system comprises one or more local query answers generated using local query data, wherein local query data are collected from the computing device.

9. The method of claim 6, wherein the query answer retrieved from the query answer cache of the remote computing system comprises one or more predicted query answers training a prediction model using local query data collected from the computing device; and generated using a prediction model, wherein the prediction model is trained using local query data collected from the computing device.

10. A computing device, comprising:
    at least one processor; and
    at least one computer-readable storage device storing instructions that, when executed by the at least one processor, cause the at least one processor to:
       execute an assistance application, wherein the assistance application generates one or more context parameters and queries a query answer cache;

predict future usage of the assistance application, wherein the future usage includes one or more queries predicted to be received by the assistance application and a time range during which the assistance application is predicted to receive at least one of the one or more queries;

predict, based on the predicted future usage of the assistance application, a network connectivity state of the computing device;

determine, based on the time range, whether the predicted network connectivity state is indicative of the computing device having network connectivity;

responsive to determining that the predicted network connectivity state is indicative of the computing device not having network connectivity during the time range:

predict, by a computing device, a plurality of predicted queries predicted to be received by the assistance application during the time range, wherein each predicted query from the plurality of predicted queries is associated with a respective set of context parameters, wherein the respective set of context parameters include at least one of a set of historical user queries for a user of the computing device, a set of historical user behaviors of the user of the computing device, and a first predicted destination;

prefetch, by the computing device and based on the plurality of predicted queries, at least one predicted query answer; and store, in the query answer cache of the computing device, the at least one predicted query answer, an indication of a predicted query associated with the at least one predicted query answer, and an indication of the respective set of context parameters associated with the predicted query associated with the at least one predicted query answer;

receive a user input;

determine at least one text query based at least in part on the user input;

responsive to determining the at least one text query, generate one or more current context parameters associated with the at least one text query, the one or more current context parameters including one or more of a current time, a current location, a current user of the computing device, and a second predicted destination;

query the query answer cache of the computing device to generate a query result based on the at least one text query and the one or more current context parameters;

determine whether the query answer cache includes a query answer for the at least one text query and the one or more current context parameters, wherein the query answer cache includes the query answer for least at least one text query when the at least one text query and the one or more current context parameters match a predicted query from the plurality of predicted queries and the respective set of context parameters associated with the predicted query from the plurality of predicted queries;

responsive to determining that the query answer cache does include the query answer, determine that the query result is the query answer;

responsive to determining that the query answer cache does not include the query answer:

send an indication of the at least one text query and an indication of the one or more context parameters to a remote computing system; and receive an indication of the query answer from the remote computing system, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters; and output an indication of the query answer.

11. The computing device of claim 10, wherein the query answer retrieved from query answer cache of the remote computing system comprises one or more global query answers generated using global query data, wherein global query data are collected from a plurality of computing devices.

12. The computing device of claim 10, wherein query answer retrieved from query answer cache of the remote computing system comprises one or more local query answers generated using local query data, wherein local query data are collected from the computing device.

13. The computing device of claim 10, wherein the query answer retrieved from the query answer cache of the remote computing system comprises one or more predicted query answers training a prediction model using local query data collected from the computing device; and generated using a prediction model, wherein the prediction model is trained using local query data collected from the computing device.

14. The computing device of claim 10, wherein the user input comprises spoken audio data, wherein the instructions stored on the at least one computer-readable storage device further cause the at least one processor to:

receive the spoken audio data from a head unit of a vehicle, wherein the spoken audio data is detected via a microphone of the vehicle.

15. The computing device of claim 14, wherein the computing device comprises a mobile computing device connected to the head unit of the vehicle, and wherein the spoken audio data is sent to the mobile computing device from the head unit.

16. The computing device of claim 10, wherein the user input comprises tactile input, wherein the instructions stored on the at least one computer-readable storage device further cause the at least one processor to:

receive tactile input from a head unit of a vehicle, wherein the tactile input is detected via a touch sensitive screen of the vehicle.

17. The computing device of claim 10, wherein the instructions stored on the at least one computer-readable storage device further cause the at least one processor to:

periodically update, based on the predicted future usage of the assistance application, the query answer cache.

18. A computer-readable storage device storing instructions that, when executed, cause at least one processor of a computing device to:

execute an assistance application, wherein the assistance application generates one or more context parameters and queries a query answer cache;

predict future usage of the assistance application, wherein the future usage includes one or more queries predicted to be received by the assistance application and a time range during which the assistance application is predicted to receive at least one of the one or more queries;

predict, based on the predicted future usage of the assistance application, a network connectivity state of the computing device;
determine, based on the time range, whether the predicted network connectivity state is indicative of the computing device having network connectivity;
responsive to determining that the predicted network connectivity state is indicative of the computing device not having network connectivity during the time range:
  predict a plurality of predicted queries predicted to be received by the assistance application during the time range, wherein each predicted query from the plurality of predicted queries is associated a respective set of context parameters, wherein the respective set of context parameters include at least one of a set of historical user queries for a user of the computing device, a set of historical user behaviors of the user of the computing device, and a first predicted destination;
  prefetch, based on the plurality of predicted queries, at least one predicted query answer; and
  store, in the query answer cache of the computing device, the at least one predicted query answer, an indication of a predicted query associated with the at least one predicted query answer, and an indication of the respective set of context parameters associated with the predicted query associated with the at least one predicted query answer;
receiving a user input;
determining, based at least in part on the user input, at least one text query;
responsive to determining the at least one text query, generate one or more current context parameters associated with the at least one text query, the one or more current context parameters including one or more of a current time, a current location, a current user of the computing device, and a second predicted destination;
querying, based on the at least one text query and the one or current more context parameters, the query answer cache of the computing device to generate a query result;
determining, based on the query result, whether the query answer cache includes a query answer for the at least one text query and the one or more current context parameters, wherein the query answer cache includes the query answer for least at least one text query when the at least one text query and the one or more current context parameters match a predicted query from the plurality of predicted queries and the respective set of context parameters associated with the predicted query from the plurality of predicted queries;
responsive to determining that the query answer cache does include the query answer, determine that the query result is the query answer;
responsive to determining that the query answer cache does not include the query answer:
  send, to a remote computing system, an indication of the at least one text query and an indication of the one or more context parameters; and
  receive, from the remote computing system, an indication of the query answer, wherein the query answer is retrieved from a query answer cache of the remote computing system, wherein the query answer cache includes a plurality of predicted query answers for the computing device, wherein each predicted query answer from the plurality of predicted query answers is associated with a respective text query and a respective set of context parameters; and
output an indication of the query answer.

* * * * *